(12) United States Patent  
Hufford et al.

(10) Patent No.: US 12,544,181 B2  
(45) Date of Patent: Feb. 10, 2026

(54) AUTOMATIC TRACKING OF TARGET TREATMENT SITES WITHIN PATIENT ANATOMY

(71) Applicant: Asensus Surgical US, Inc., Durham, NC (US)

(72) Inventors: Kevin Andrew Hufford, Cary, NC (US); Mohan Nathan, Raleigh, NC (US)

(73) Assignee: KARL STORZ SE & Co. KG, Tuttlingen (DE)

( * ) Notice: Subject to any disclaimer, the term of this patent is extended or adjusted under 35 U.S.C. 154(b) by 133 days.

(21) Appl. No.: 17/368,756

(22) Filed: Jul. 6, 2021

(65) Prior Publication Data

US 2022/0000578 A1    Jan. 6, 2022

Related U.S. Application Data

(60) Provisional application No. 63/048,180, filed on Jul. 5, 2020.

(51) Int. Cl.
| | |
|---|---|
| *A61B 5/05* | (2021.01) |
| *A61B 34/00* | (2016.01) |
| *A61B 34/10* | (2016.01) |
| *A61B 34/20* | (2016.01) |
| *A61B 34/37* | (2016.01) |
| *A61B 90/00* | (2016.01) |

(52) U.S. Cl.
CPC .............. *A61B 90/37* (2016.02); *A61B 34/10* (2016.02); *A61B 34/20* (2016.02); *A61B 34/37* (2016.02); *A61B 34/74* (2016.02); *A61B 2034/107* (2016.02); *A61B 2034/2068* (2016.02)

(58) Field of Classification Search
CPC ......... A61B 90/37; A61B 34/10; A61B 34/20; A61B 34/37; A61B 2034/107; A61B 2034/2068

See application file for complete search history.

(56) References Cited

U.S. PATENT DOCUMENTS

| | | | | |
|---|---|---|---|---|
| 2007/0239011 | A1* | 10/2007 | Lau ........................ | A61N 7/022 601/2 |
| 2009/0259150 | A1* | 10/2009 | Ostrovsky .............. | A61N 7/022 601/2 |
| 2015/0267257 | A1* | 9/2015 | Nagarkatti ........... | C12Q 1/6883 514/165 |
| 2016/0081656 | A1* | 3/2016 | Abraham ............... | A61B 8/582 600/439 |
| 2017/0273716 | A1* | 9/2017 | Garofalo ............ | A61B 17/3439 |
| 2019/0216540 | A1* | 7/2019 | Melsky .................. | A61B 18/24 |

* cited by examiner

*Primary Examiner* — Joel F Brutus

(57) ABSTRACT

During a medical procedure, a system and method facilitate identification and treatment of sites within patient anatomy. A digital image of a region of patient anatomy is captured and displayed on a digital display. Target treatment sites are tagged with respect to the image, and overlays identifying the tagged target treatment sites are displayed. As tagged sites are treated, the corresponding overlays are removed, altered or replaced to indicate the tagged target treatment site has been treated.

27 Claims, 5 Drawing Sheets

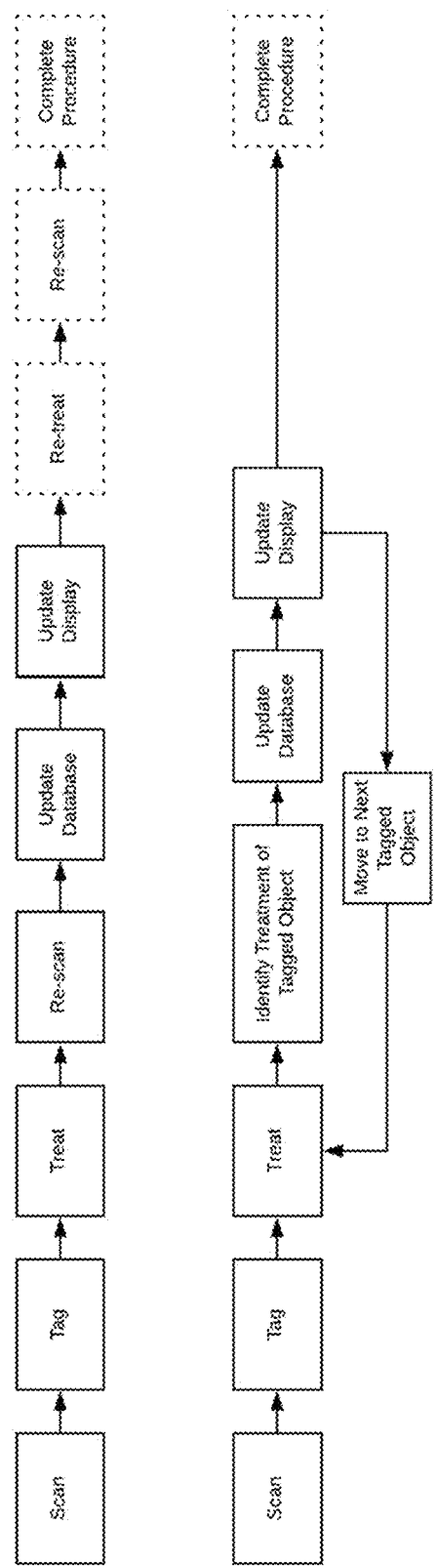

Fig. 2A: Example endoscopic view showing endometriosis lesions

Fig. 2B: User interface showing overlay on endometriosis lesions to be treated

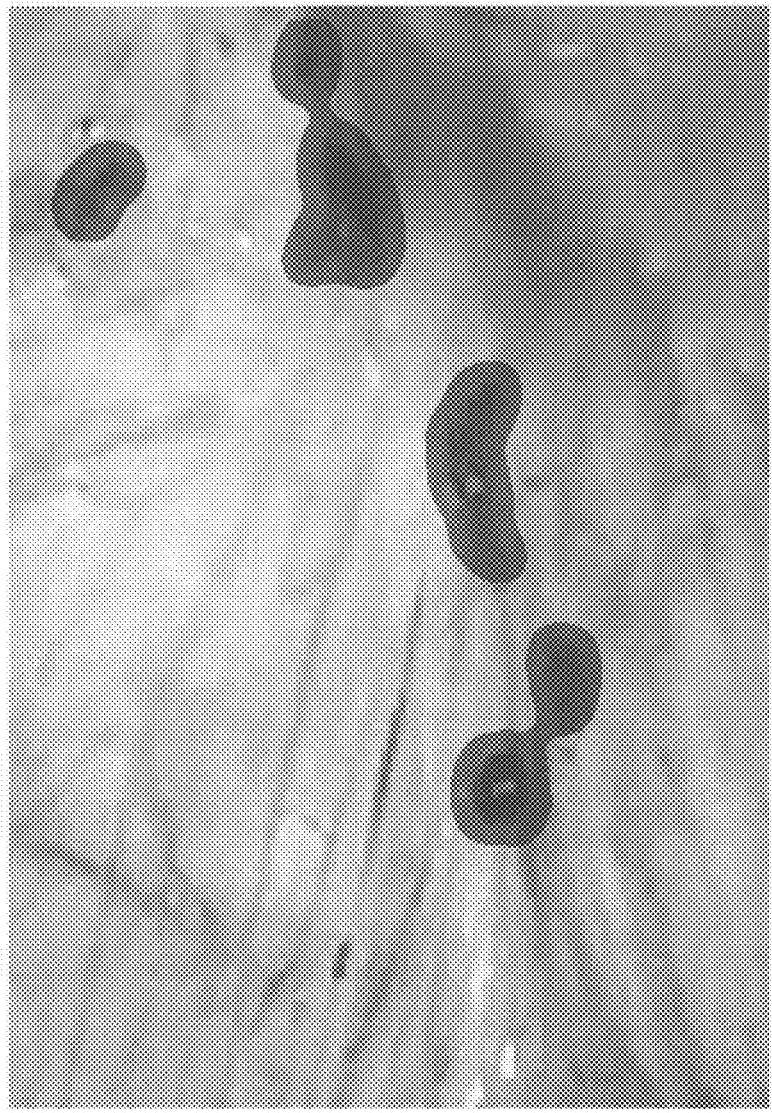
Figure 3: User may zoom in for better visibility during treatment. Display updates to show that treatment has occurred. Regions outside the current endoscopic view continue to be tracked.

Figure 4: User Interface of an overall view showing both treated and untreated regions.

AUTOMATIC TRACKING OF TARGET TREATMENT SITES WITHIN PATIENT ANATOMY

BACKGROUND

In a surgical procedure, it is necessary for the surgeon to keep track of the regions within the patient anatomy that are to be treated. For example, during surgery to treat endometriosis, the surgeon will want to remain aware of endometriosis lesions that s/he wishes to treat before concluding the procedure. In other types of surgery, the surgeon may want to keep track of lesions, regions of abnormal tissue, tumors, etc. for treatment or evaluation.

In some procedures, there may be a relatively large number of regions to keep track of numerically, and the regions may be spatially and visually dispersed at the treatment site. The practitioner maneuvers the endoscope within the surgical field to identify the areas of interest, such as by zooming the camera in/out and moving it around in the surgical field, but must rely on spatial memory to track where the regions to be treated are with respect to other anatomy or other target regions. At times, other anatomy within the surgical site may move and occlude visualization of these regions to be treated.

This application describes a system for planning, executing, and providing cueing information to the user, in each case relating to assessment and/or treatment of identified regions or sites within the surgical field, ensuring that clinical metrics with regard to those regions/sites are satisfied.

BRIEF DESCRIPTION OF THE DRAWINGS

FIG. 1A is a sequence of steps schematically illustrating a first embodiment of the disclosed method.

FIG. 1B is a sequence of steps schematically illustrating a second embodiment of the disclosed method.

FIG. 2A shows an image of a treatment site as captured by an endoscopic camera and displayed to a user on a display and shows endometriosis lesions at the treatment site.

FIG. 2B is similar to FIG. 2A but shows an overlay on the displayed image. The overlay shows colored regions overlaying the endometriosis lesions.

FIG. 3 is similar to FIG. 2B but shows the display following enlargement of the image ("zooming in") by the user, either using camera movement, optical zoom, or digital zoom. A characteristic of the overlays (e.g. color, pattern, outline characteristics, etc.) is changed on the display after lesions are treated.

FIG. 4 is similar to FIG. 3 but shows the site after the camera has been "zoomed out." Both treated and untreated lesions are shown with their respective overlay types.

DETAILED DESCRIPTION

In general, a system includes an image capture device such as a camera for capturing images of a treatment site, an image display for displaying the images, at least one processor for receiving the images and which includes a memory storing instructions for executing the various features described here, and a database associated with the processor. User input devices may also be included, such as, without limitation, vocal input devices, manual input devices (e.g. buttons, touch inputs, knobs, dials, foot pedals, eye trackers, trackers etc.). In some configurations, the system is used with a robot-assisted surgical system, in which case the input devices may be part of the surgeon console used by the surgeon to give input to the surgical system to command movement and actuation of surgical instruments carried by robotic manipulators.

In accordance with the disclosed method, areas within the treatment site that are targeted for treatment are entered into a database. Real time images captured during the treatment procedure are displayed on an image display, and graphical overlays are displayed on the image display to visually mark the areas. During the course of treatment, the system tracks the areas to be treated, and, preferably but optionally, also tracks the areas that have been treated, in some cases changing characteristics of the overlays of treated sites so the user may easily distinguish between sites that have been treated and sites that are yet to be treated. Treatment for each region is updated and tracked during the course of the procedure. Feedback on each tracked region (e.g. indicating that it has been treated) is provided to the system. Feedback on each tracked region is provided to the user, such as using the overlays described above, which appear different depending on whether the site is treated or untreated.

To enter the areas for treatment (also referred to as "target areas") into the database, a scan of the relevant anatomy is input to the system. This may be a single scan or multiple scans, which may be sequential. In one embodiment, the scan is captured during the course of the treatment procedure using a camera or other form of imaging device positioned in a body cavity to image the relevant anatomy. In other embodiments, the scan is a pre-treatment scan captured using an endoscope or other type of imaging system. For convenience, this description focuses on the use of an endoscopic/laparoscopic camera for capturing the scan.

Areas for treatment captured by the scan image data are identified or tagged relative to the scan in one or more of a variety of ways. As a first example, a user viewing the scan on an image display identifies the areas to the system. Non-limiting examples for this include:

- Touching the areas on a touch screen displaying the scan (which as mentioned may be a real time image of the site) using a finger or stylus.
- Navigating a physical pointing device, which may be a medical instrument, to the area for treatment within the treatment site, to identify the area to the system. In this example, the position of the instrument may be identified using computer vision that "sees" the medical instrument in the image and records its position with respect to the image, or, if the medical instrument is maneuvered by a robotic manipulator it may use kinematic data from the robotic system or some combination of image data and kinematic data.
- Navigating a virtual pointing device that is shown on the image display, such as an arrow icon, using a user input device such as a mouse, touch pad, eye tracker, head tracker, multi-degree-of-freedom input device, or an input device used to control manipulators of a robotic surgical system. The virtual pointing device might also be displayed a predetermined distance from the tip of an instrument within the treatment site (i.e. imaging processing is used to recognize a part of the instrument such as its tip or jaw clevis), and the user moves the virtual pointer by moving the instrument.

Each of the above examples may optionally include a subsequent step of confirming the locations to the system using a confirmatory input such as a voice command, button press, foot pedal press, or some other form of input.

As a second example for identifying areas for treatment relative to the scan image, image processing may be used to recognize types of abnormal tissue, such as endometriosis lesions, tumors, or others. In this example, the system might generate graphical overlays (e.g. highlighting, shading, bounding, arrows, etc.) marking the regions it has identified as being potential treatment areas of the type the user is seeking to identify. As a subsequent, optional, step, the user may be prompted to confirm that the marked regions are treatment areas to be tracked during the procedure. The types of user input that could be used for this purpose include but are not limited to those discussed above.

In a third example for identifying areas for treatment relative to the scan image, the user might use the input methods discussed above to identify a region to the system, and the system might then perform image processing to identify the endometriosis lesions or other target tissues within the identified regions.

Tagging may occur at the beginning of a procedure but may also occur during a procedure as new targets are identified.

Overlays generated and displayed on the image display are preferably used to visually mark target areas identified using any available methods, including those discussed above. As non-limiting examples, the system might generate graphical overlays such as highlighting, shading, bounding, arrows, etc. marking the target areas. The overlays are tagged to image data. As the user moves the endoscope around the relevant anatomy, some tagged target sites will be off-screen at times, but they and their corresponding overlays will reappear when the endoscope returns to a position in which those tagged target sites are within the displayed field of view.

The target areas are then treated using the type of instrument suitable for treatment of the treatment areas, such as devices for excision, vaporization or cauterization of abnormal tissues such as endometriosis lesions. The treatment might be one directly performed by the user using manual laparoscopic or surgical instruments or using robotically manipulated instruments maneuvered and actuated in response to user inputs at a surgeon console. In other implementations, the treatment is carried out using a robotic system while the user provides supervisory oversight in a supervised autonomy mode or in a semi-autonomous procedure. In still other implementations, treatment is part of a fully autonomous surgical procedure which makes use of the recognition and tracking features described in this application.

In preferred systems, the overlays marking the treatment areas are updated or altered to differentiate as-yet untreated target areas from those that have been treated. This might include a change in color, shading, border color, thickness, or characteristics (e.g. dashed vs continuous), addition of a particular graphical overlay (e.g. a checkmark), removal of the overlay altogether, etc.

Input to the system as to whether a target area has been treated can be given by the user, or the system can determine that a given target area has been treated. In the former example, the user can identify treated areas to the system using input methods of the type described above, allowing the user to directly "check the items off a list" as treatment is performed via an input device.

In the latter example, computer vision may be used to determine that treatment has been performed via a variety of means, such as, but not limited to:

Change in color of the tissue at the target site (i.e. detecting eschar from a cauterized lesion)
recognition of the presence of predetermined treatment instruments above the tracked target for a certain period of time and/or moving in accordance with motions predetermined and known by the system to be those used for the relevant treatment
Recognition of the presence of predetermined instruments above the tracked target, together with input from, for example, a processor associated with an electrosurgical unit or laser system indicating that the instruments have been energized or operated.

Visual feedback to the user may additionally present metrics indicative of the progress made towards completing treatment of the identified sites. For example, the visual display may present a metric such as "10 of 30" or present a graphical "progress bar" (indicating the number of sites treated out of the entire number of identified target areas), with the metric updated during the course of the procedure.

Simple flow diagrams illustrating exemplary methods are depicted in FIGS. 1A and 1B. The example illustrated in FIG. 1B includes the following steps, using the specific example of endometriosis lesion treatment.

Overall scan, or sequential scan is input to the system
Endometriosis lesions are identified
Identified, tagged by user
Identified, tagged by CV/AI (with or without user confirmation)
Tagged
Provide visual overlay onto each lesion
Update display and database of tracked lesions as their status changes In alternative method depicted in FIG. 1A, the treatment site is subjected to a pre-scan, targets are identified, treatment is performed, and then the area is re-scanned, after which the system shows confirmation of treatment in the treated areas.

A representation of the user interface and the progression of the feedback provided to the user are shown in the sequence of images shown at FIGS. 2A-4.

FIG. 2A shows an example of an endoscopic view of a region of patient anatomy as displayed on an image display. Endometriosis lesions are visible as dark spots on the tissue.

FIG. 2B shows the image of the region after overlays have been added to the image display to mark the lesions that are to be treated.

In preparation for treating some of the lesions, the user may at this stage decide to enlarge a particular region of the anatomy on the image display by moving the camera closer to the tissue or operating a zoom function associated with the camera or vision system. FIG. 3 shows the view zoomed-in so the region bounded by the dashed rectangle in FIG. 2B is enlarged on the image display, after the user has treated the identified lesions within that field of view. The visual appearance of the overlays within the view has been changed to mark them as having been treated. In this example the change is a color change from bright green (marking un-treated lesions) to dark purple (marking treated lesions).

In FIG. 4, the view has been zoomed back out to the view shown in FIG. 2B, and so the untreated lesions outside the view of FIG. 3 as well as their overlays have come back into view. The untreated lesions remain marked by overlays representing untreated lesions, while the treated lesions remain marked by overlays representing treated lesions.

To expedite movement between treated and untreated lesions, and to ensure all identified lesions are treated, the system may be optionally configured to receive a command from the user to show untreated lesions remaining in the anatomy. In response, the system might alter the field of view displayed on the image display by showing a portion of the captured image that is outside the field of view currently being displayed (e.g. by automatically zooming the image out, or by physically moving the camera in pan and/or zoom). Alternatively, directional graphics may appear on-screen pointing the user to a direction relative to the displayed image, indicating that untreated lesions are presented in that direction relative to the displayed image. This allows the user to move the camera or adjust the image to display the region in the indicated direction so s/he can view and treat the untreated lesions.

The disclosed system and method provide the advantages of enabling the tracking of regions requiring treatment and as well as their change in status once treated, giving live overlays and simultaneous tracking of regions requiring treatment outside of the user's current field of view. This assists the surgeon with direct, real-time feedback that can enhance the efficiency of the treatment procedure.

What is claimed is:

1. A medical treatment method comprising the steps of
capturing a digital image of a region of patient anatomy, the region having a plurality of sites of abnormal tissue identifiable by visible inspection of tissue in the region, each site of abnormal tissue comprising an endometriosis lesion or a tumor;
displaying the digital image on an image display;
before delivering treatment to any of the sites of abnormal tissue:
receiving, from a user visually observing the region in the digital images displayed on the display, user input identifying a plurality of target treatment sites, said plurality of target treatment sites comprising sites of abnormal tissue which have been visually identified by the user while observing the display, and
in response to the user input, for each target treatment site within the plurality of target treatment sites identified using the user input, displaying a corresponding overlay superimposed on each said target treatment site on the digital image displayed on the image display;
after delivering treatment to a target treatment site, removing, altering, or replacing the corresponding overlay on the image display to indicate the target treatment site has been treated.

2. The medical treatment method of claim 1, wherein the method includes, prior to indicating a target treatment site has been treated, receiving user input identifying that said target treatment site has been treated.

3. The medical treatment method of claim 2, wherein the method includes, prior to indicating a target treatment has been treated, receiving input from a treatment device positioned in proximity to the target treatment site, said input signaling that treatment has been performed by the treatment device.

4. The medical treatment method of claim 1, wherein the method includes, prior to indicating a target treatment site has been treated, using computer vision to recognize that said target treatment site has been treated.

5. The medical treatment method of claim 1, wherein each target treatment site is an endometriosis lesion.

6. The medical treatment method of claim 1, wherein each target treatment site is a tumor.

7. The medical treatment method of claim 1, wherein receiving user input identifying a target treatment site comprises displaying the digital images on a touchscreen, and receiving user input in response to contact with a portion of the touchscreen at which said target treatment site is displayed.

8. The medical treatment method of claim 1, wherein the method includes positioning a surgical instrument in proximity to tissue of interest in a body cavity, and wherein receiving user input identifying a target treatment site comprises using computer vision to recognize the surgical instrument.

9. The method of claim 1, wherein the method includes delivering treatment to target treatment sites electrosurgically.

10. The method of claim 1, wherein the method includes delivering treatment to target treatment sites using laser energy.

11. The method of claim 1, wherein the method includes delivering treatment to target treatment sites using excision.

12. The method of claim 1, wherein the method includes delivering treatment to target treatment sites using vaporization.

13. The method of claim 1, wherein the method includes delivering treatment to target treatment sites using cauterization.

14. The method of claim 1, wherein the digital images and the overlays are displayed in real time on the display.

15. The method of claim 1, wherein removing, altering, or replacing the corresponding overlay comprises altering the corresponding overlay.

16. The method of claim 1, wherein removing, altering or replacing the corresponding overlay comprises replacing the corresponding overlay.

17. The method of claim 1, wherein removing, altering or replacing the corresponding overlay comprises replacing the corresponding overlay.

18. A medical treatment method comprising the steps of
capturing a digital image of a region of patient anatomy, the region having a plurality of sites of abnormal tissue identifiable by computer vision analysis of images of tissue in the region, each site of abnormal tissue comprising an endometriosis lesion or a tumor;
displaying the digital image on an image display;
before delivering treatment to any of the sites of abnormal tissue:
using computer vision to recognize a plurality of the sites of abnormal tissue in the digital image, said sites of abnormal tissue recognized using computer vision being target treatment sites, and
for each target treatment site in the plurality of target treatment sites, displaying a corresponding overlay superimposed on said target treatment site on the digital image displayed on the image display;
after delivering treatment to a target treatment site, removing, altering, or replacing the corresponding overlay on the image display to indicate the target treatment site has been treated.

19. The medical treatment method of claim 18, wherein the method includes, prior to indicating a target treatment site has been treated, receiving user input identifying that said target treatment site has been treated.

20. The medical treatment method of claim 18, wherein the method includes, prior to indicating a target treatment site has been treated, using computer vision to recognize that said target treatment site has been treated.

21. The medical treatment method of claim 18, wherein the method includes, prior to indicating a target treatment has been treated, receiving input from a treatment device positioned in proximity to the target treatment site, said input signaling that treatment has been performed by the treatment device.

22. The medical treatment method of claim 18, wherein each target treatment site is an endometriosis lesion.

23. The medical treatment method of claim 18, wherein each target treatment site is a tumor.

24. The method of claim 18, wherein removing, altering, or replacing the corresponding overlay comprises altering the corresponding overlay.

25. The method of claim 18, wherein removing, altering or replacing the corresponding overlay comprises replacing the corresponding overlay.

26. The method of claim 18, wherein removing, altering or replacing the corresponding overlay comprises replacing the corresponding overlay.

27. The method of claim 18, wherein the digital images and the overlays are displayed in real time on the display.

\* \* \* \* \*